United States Patent [19]

Clarke et al.

[11] Patent Number: 4,688,296
[45] Date of Patent: Aug. 25, 1987

[54] MEANS FOR BREAKING DOWN CARCASSES

[75] Inventors: Peter T. Clarke, Sampson; Barteld Valom, Thornlie, both of Australia

[73] Assignee: The State of Western Australia Department of Agriculture, South Perth, Australia

[21] Appl. No.: 756,983

[22] PCT Filed: Sep. 10, 1984

[86] PCT No.: PCT/AU84/00177
§ 371 Date: Jun. 28, 1985
§ 102(e) Date: Jun. 28, 1985

[87] PCT Pub. No.: WO85/01187
PCT Pub. Date: Mar. 28, 1985

[30] Foreign Application Priority Data

Sep. 9, 1983 [AU] Australia ............................ PG1344

[51] Int. Cl.⁴ ...................... A22B 7/00; A22C 17/00; A22C 18/00
[52] U.S. Cl. ...................................... 17/1 R; 17/52; 17/23
[58] Field of Search .................... 17/1 R, 23, 1 A, 52

[56] References Cited

U.S. PATENT DOCUMENTS

| 1,015,590 | 1/1912 | Saunders | 17/23 |
| 3,234,591 | 2/1966 | Vogt et al. | 17/1 R X |
| 3,546,737 | 4/1968 | Neebel et al. | 17/1 R |
| 3,693,216 | 9/1972 | Willems et al. | 17/1 A X |
| 3,886,658 | 6/1975 | Wikoff | 17/23 X |
| 4,118,777 | 10/1978 | Wallace | 17/23 X |
| 4,449,271 | 5/1984 | Karubian | 17/23 |
| 4,557,014 | 12/1985 | Vogt | 17/1 R |
| 4,558,487 | 12/1985 | Vogt | 17/1 R |

*Primary Examiner*—Willie G. Abercrombie
*Attorney, Agent, or Firm*—Harness, Dickey & Pierce

[57] ABSTRACT

Means for braking down carcasses such as sheep and pigs comprising a pair of endless belt for conveying the carcass legs uppermost to a splitting saw for cutting along the backbone of the carcass, means for holding the split carcass as it moves along, and a saw for cutting the carcass laterally, the positions of the lateral cuts being predetermined (i) by an operator viewing the carcass through a video system and indicating the position by a pointer, the information being stored in a microprocessor which controls the relative position of the saw and the carcass or (ii) by an algorithm stored in the microprocessor.

19 Claims, 12 Drawing Figures

MEANS FOR BREAKING DOWN CARCASSES

This invention relates to improved means for breaking down carcasses such of those of sheep and pigs.

In the past it has been the practice to split carcasses into two halves using a band saw or the like and then break each half down into primary pieces by manual butchering. The provision of automatic means to achieve this result has not been considered practical because of variation in the dimensions of the individual carcasses and the difficulties in accurately positioning the carcass and holding it while cutting takes place.

The object of the present invention is to provide means for automatically breaking down carcasses into primary pieces.

In one form the invention resides in means for breaking down carcasses comprising means for conveying a carcass past a viewing station to enable the operator to select the position of the cuts required to break the carcass into primary pieces, means for recording the selected positions and feeding them to a microprocessing unit, means for splitting the carcass in half along the back bone, means for cutting the carcass laterally with respect to the back bone and means activated and controlled by the microprocessor unit for moving the cutting means relative to the carcass to bring the carcass and/or the cutting means to the required position to the effect the transverse cuts.

The invention will be better understood by reference to the following description of one specific embodiment thereof shown in the accompanying drawings wherein.

Figure 1:
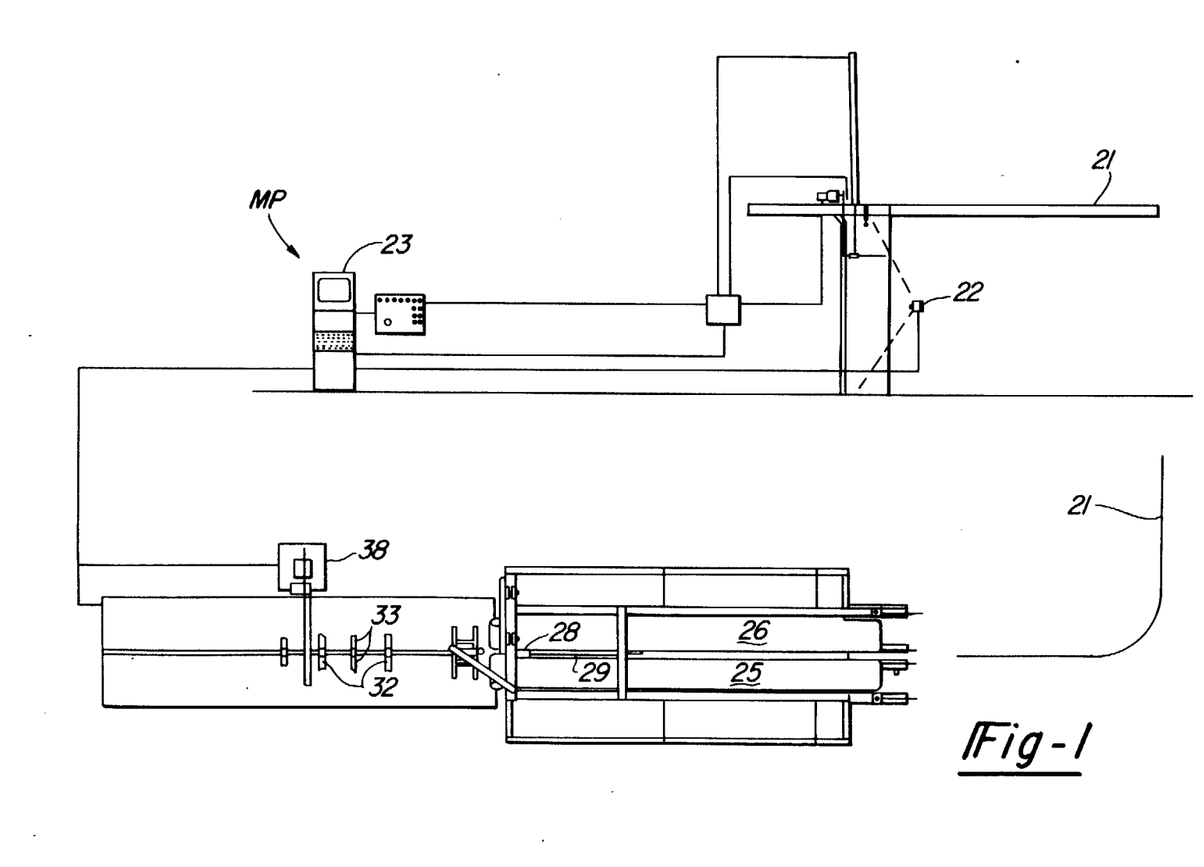
FIG. 1 shows the overall layout of the plant the top half being in elevation and the lower half in plan.
Figure 2:
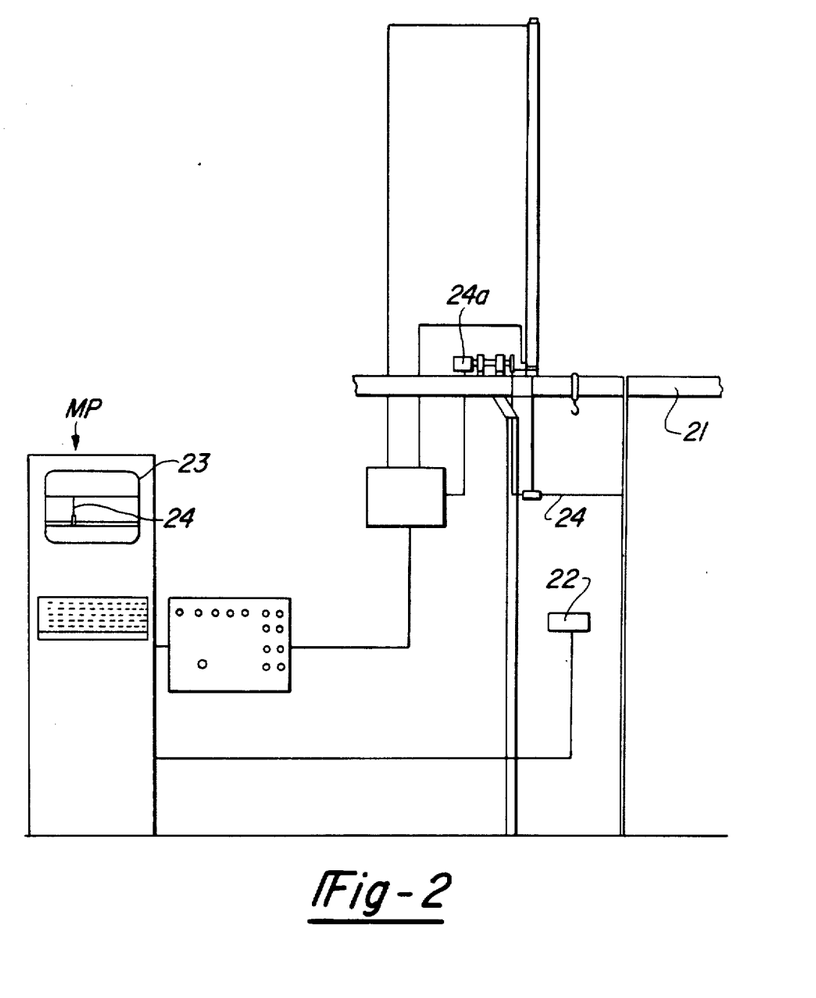
FIG. 2 shows the sizing of the carcass and recording of the data on the computer which is remotely located.

As shown in the drawings the carcasses to be treated or broken down are carried on a conventional conveyor 21 to the unit and as they do so they are viewed by means of a television camera 22 and the image shown in a video screen 23. The operator activates a pointer 24 to indicate the positions where the lateral cuts are to be made to break the carcass down into its primary pieces the image of the pointer appearing on the screen 23.

The pointer 24 is coupled to a length transducer such as a potentiometer 24a which acts to measure the distance travelled by the pointer and this information is fed to the microprocessor on request. The information as to the positions is stored by the microprocessor MP which activates and controls the operation of the various components as hereinafter described.

In an alternative arrangement not shown in the drawings the image of a carcass of the species of animal being processed recorded in a vision system such as a video camera is interpreted by an algorithm stored in the memory of the microprocessor. The position of lateral cuts to be made in the carcass is decided by the algorithm rather than by a human operator thus further reducing the labour required.

Figure 3:
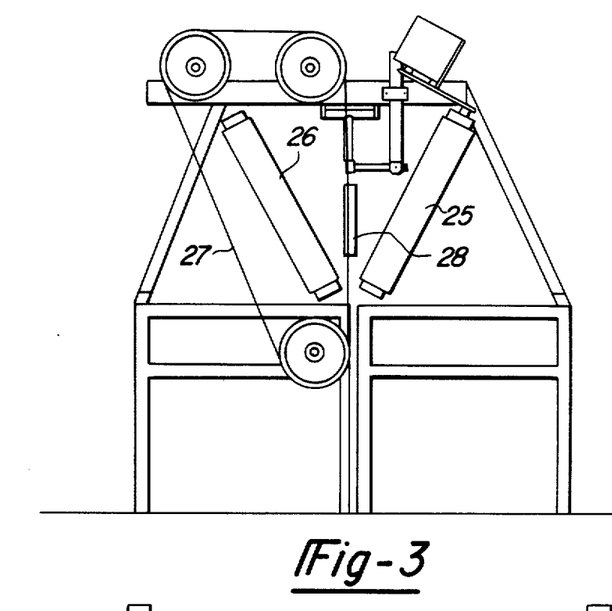
FIG. 3 is an elevation of the carcass carrier and band saw for splitting the carcass into two havles.
Figure 4:
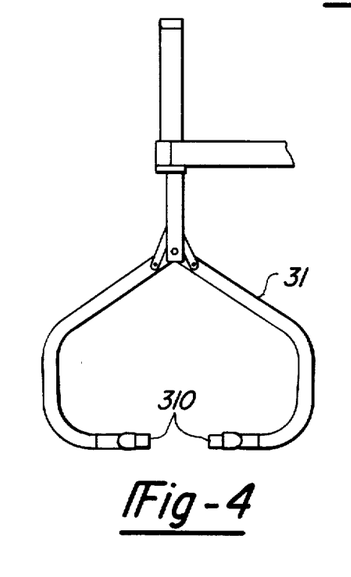
FIG. 4 is an end elevation of stabilising means to keep the two halves of the carcass together after splitting.
Figure 5:
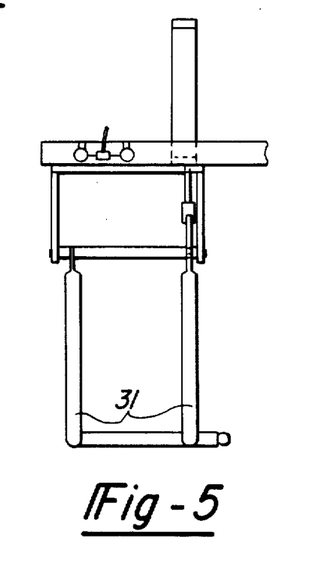
FIG. 5 is a side elevation corresponding to FIG. 4.

The carcass is removed either manually or through a dismount system from the conveyor 21 and placed with legs projecting upwardly and the hindquarters leading between a pair of inclined endless belts 25 and 26 which feed it towards an endless band saw 27 which cuts the carcass into two halves along the back bone. The band saw 27 is activated by a sensing member 28 carried on an arm 29 so that movement of the arm on the approach of the carcass activates a microswitch which activates the entire control sequence through the microprocessor. The sensing member 28 also acts to keep the flaps of the carcass apart and clear of the band saw during the splitting operation. As the carcass emerges from between the belts 25, 26 it supported on support 30 and is stabilised by the stabilising members 31 as shown in FIG. 4 to prevent the two halves falling apart. The ends of the member 31 bearing against the carcass are fitted with rollers 31a.

If desired the band saw 27 may be replaced by the two band saws spaced apart to cut on either side of the backbone so that the backbone is removed during the splitting of the carcass.

In an alternative arrangement not shown in the drawings the splitting of the carcass may be achieved using a circular saw rather than a band saw. The microprocessor may be used to position the circular saw in relation to the carcass so that it cuts through the backbone only, leaving the skin covering the backbone intact. This is achieved by mounting a position transducer just prior to the circular saw and located so as to contact the surface of the carcass to measure the position of the skin. This information is fed to the microprocessor to enable it to correctly position the saw. This arrangement is particularly suitable in the processing of pigs when it is intended to remove the skin for tanning as it maintains a larger unbroken skin surface.

Figure 6:
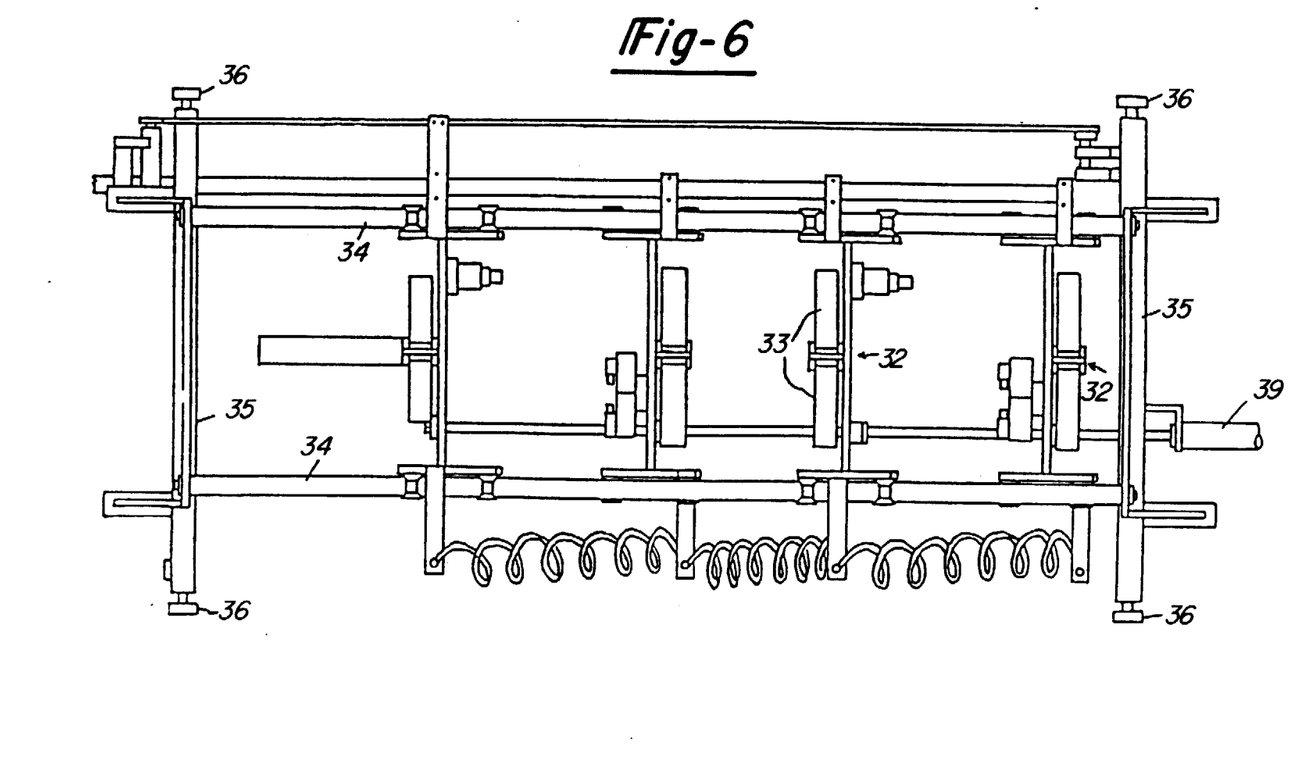
FIG. 6 is a plan of an upper carriage supporting a series of supporting and holding devices positioned to allow lateral cuts of the carcass.
Figure 7:
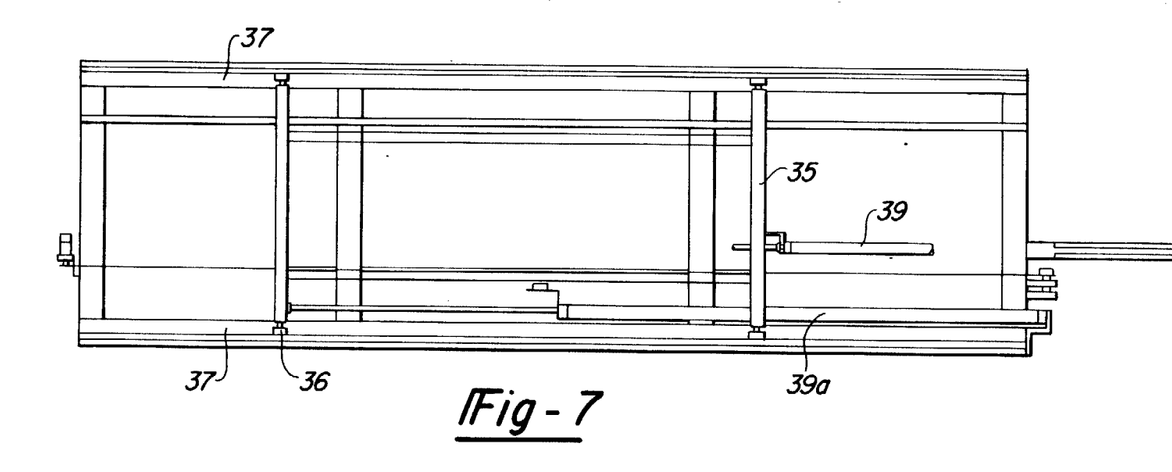
FIG. 7 is a plan of the lower portion of the unit on which the upper carriage of FIG. 6 (shown in light lines) is supported.
Figure 8:
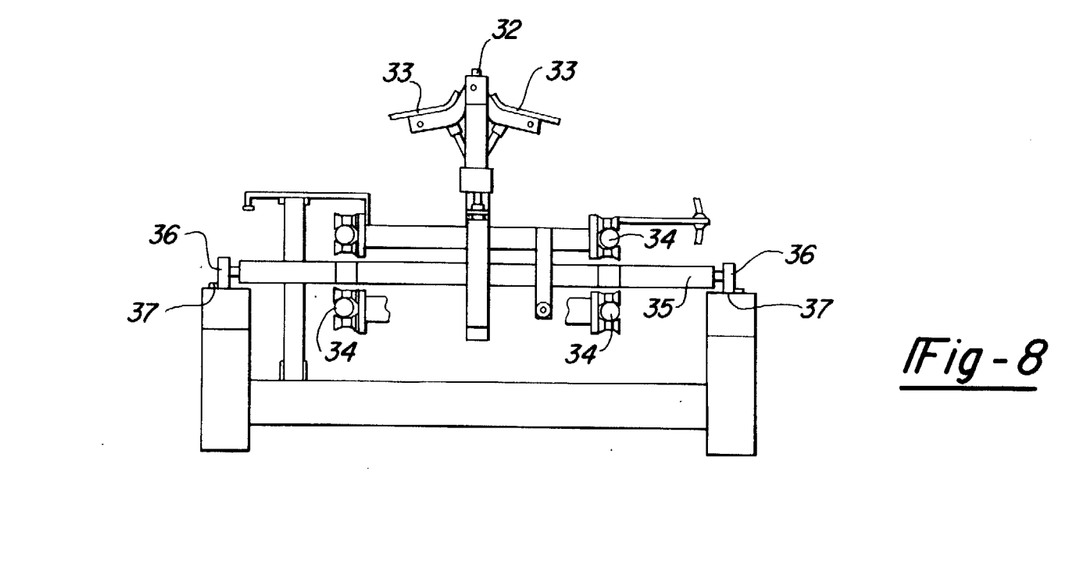
FIG. 8 is a sectional elevation of the lower portion of FIG. 7, the movable upper carriage of FIG. 6 and one supporting and holding device for gripping the carcass.

Aligned with the support 30 is a series of mobile supports 32 each provided with a pair of air operated clamps 33. The supports 32 are each mounted to travel on one pair of two pairs of rails 34 which are joined by transverse members 35 to form an upper carriage. The members 35 are provided with rollers 36 adapted to run in tracks 37. Each of the supports 32 are linked together by a flexible link 32 whilst the first of the supports is connected to an air cylinder 39. The supports are all bunched together at the end of the support 30 to receive the carcass. After the hindquarters of the carcass has moved beyond the support 30 the first of the supports is operated with the clamps 33 moving upwardly to engage the carcass. The cylinder moves the first support 32 away from the support 30 with the clamps 33 of the remaining supports 32 successively engaging the carcass. The clamps 33 are located so that they are clear of the established laterally cutting positions. The upper carriage with the carcass held firmly by the clamps 33 is then advanced through the action of air cylinder 39a past a band saw 38 which can be lowered to make the required lateral cuts at the position dictated by the microprocessor.

Figure 9:
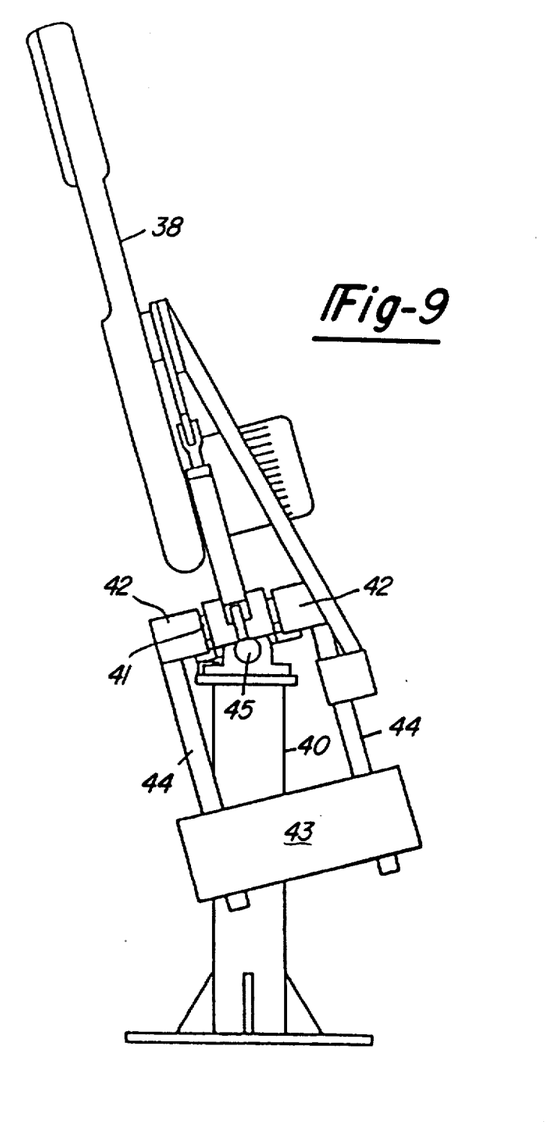
FIG. 9 is a rear elevation of a tiltable band saw positioned at one side of the unit.
Figures 10, 11:
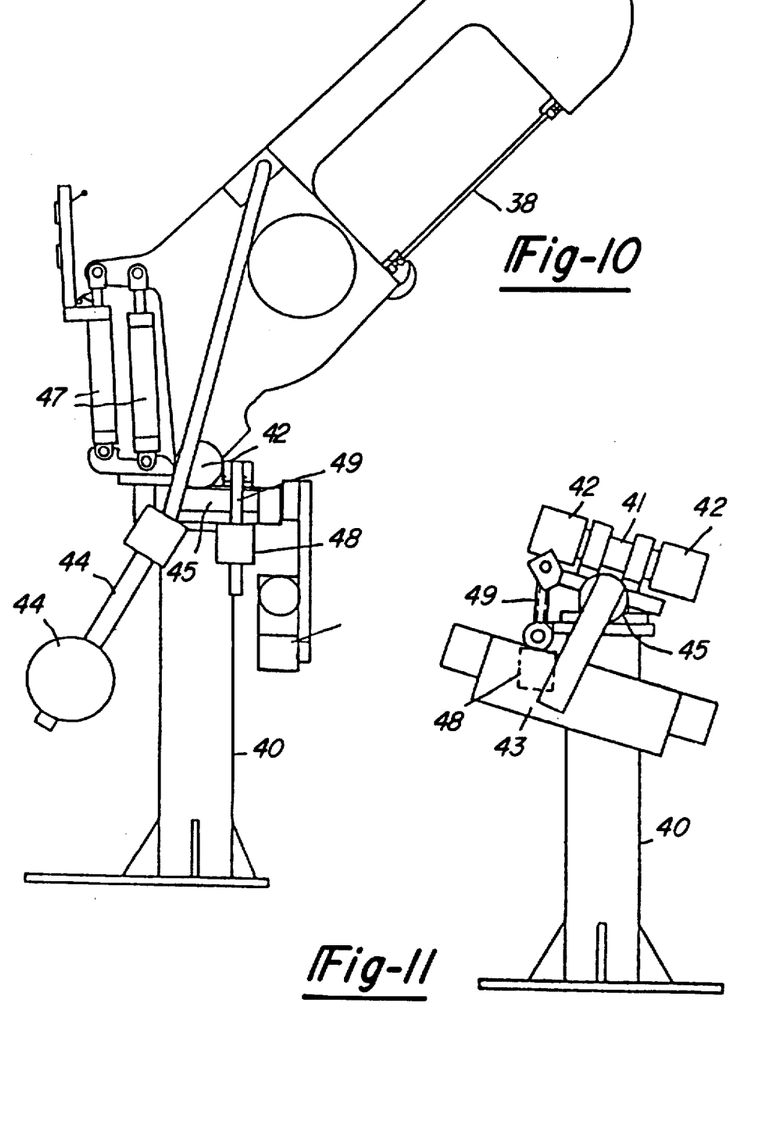
FIG. 10 is a side elevation of the band saw.
FIG. 11 is a fragmentary elevation of the band saw base.
Figure 12:
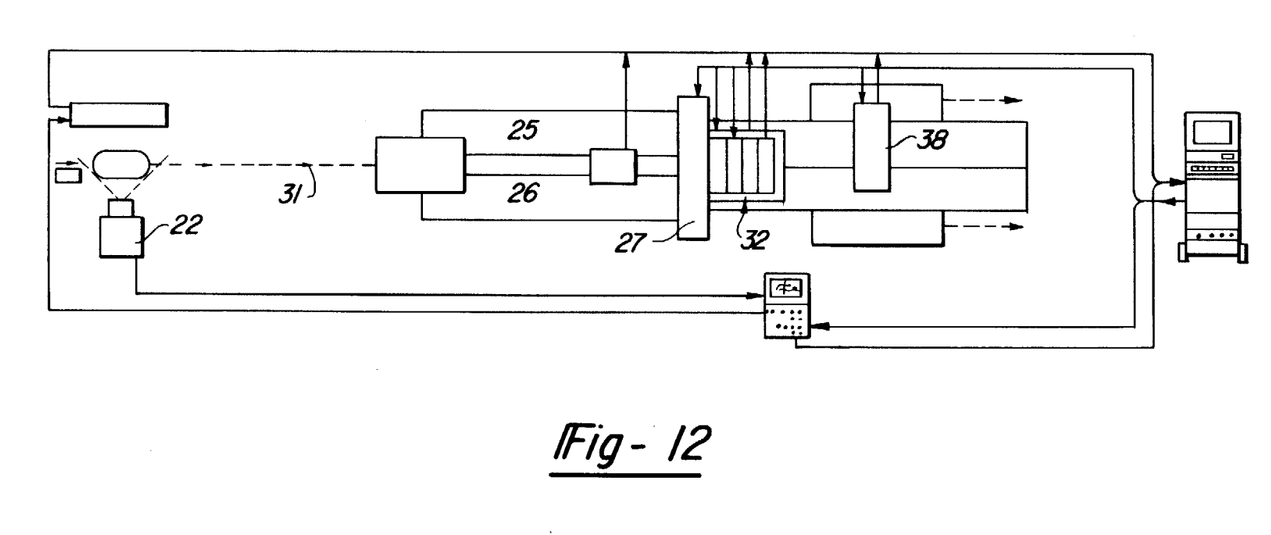
FIG. 12 is a block diagram showing the functional layout of the unit.

The saw 38 is pivotally mounted on a shaft 41 supported in bearing 42 to which are attached a counterweight 43 through arms 44. The assembly is pivotally mounted on a transverse horizontal shaft 45 on top of a supporting pillar 40 so that the saw can be rotated from a vertical position to an angled position as is shown in FIG. 9 of the drawings. A counterweight 46 is fixed to the shaft 45 as shown in FIG. 10. The rotation of the saw to the cutting position is effected through air cylinders 47 (see FIG. 10). The saw is tilted to the required angle by means of an air motor 48 driving a lead screw 49. After the lateral cuts have made the pieces fall to each side of the unit and are carried away for packing or further processing.

Whilst the invention has been described with particular reference to a number of specific embodiments it is not limited thereto. For example the saw to make the lateral cuts may be positioned immediately adjacent the band saw 27 and the operation of the belts 25, 26 controlled to advance the carcass to the required lateral cutting position in a stepping motion. This eliminates the need for supports 32 and the associated equipment.

The microprocessor may be used for the collection of data. For example by fitting weighing units at appropriate locations and feeding the information therefrom into the microprocessor it is possible to record the weight of carcasses processed and the weight of the different cuts of the carcass produced.

The claims defining the invention are as follows:

1. Means for breaking down carcasses comprising means for conveying a carcass past a viewing station to enable the operator to select the position of the cuts required to break the carcass into primary pieces, means for recording the selected positions and feeding them to a microprocessing unit, means for splitting the carcass in half along the back bone, means for retaining the halves of the split carcass in their original position relative to each other during subsequent cutting operations, means for cutting the held and split carcass halves laterally with respect to the back bone, and means activated and controlled by the microprocessor unit for moving the cutting means relative to the carcass to bring the carcass and the cutting means to the required relative positions to effect the transverse cuts.

2. Means for breaking down carcasses as claimed in claim 1 wherein the view of the carcass provided by the viewing station is interpreted by an algorithm stored in the microprocessor to determine the position of the lateral cuts.

3. Means for breaking down carcasses as claimed in claim 1 wherein the means for splitting the carcass comprising a pair of inclined endless belts for conveying the carcass with the feet projecting upwardly and a saw located adjacent the forward end of the endless belts.

4. Means for breaking down carcasses as claimed in claim 3 wherein a sensing member is positioned so that it is activated on the approach of the carcass to initiate operation of the saw and the microprocessor.

5. Means for breaking down carcasses as claimed in claim 1 wherein the means for retaining the split carcass halves comprise stabilizing means to clamp and hold the two halves of the carcass located ahead of the splitting means upon a support.

6. Means for breaking down carcasses as claimed in claim 2 wherein the means for cutting the carcass laterally comprises a band saw positioned adjacent the line of travel of the split carcass and supported for pivotal movement about a horizontal axis parallel to the line of travel of the split carcass and about a horizontal axis transverse to the line of travel of the split carcass.

7. Means for breaking down carcasses as claimed in claim 3 wherein the saw comprises a circular saw.

8. Means for breaking down carcasses as claimed in claim 7 wherein the microprocessor positions the saw in response to signals fed to the microprocessor from a position transducer located slightly to the rear of the saw.

9. Means for breaking down carcasses as claimed in claim 2 wherein the means for splitting the carcass comprising a pair of inclined endless belts for conveying the carcass with the feet projecting upwardly and an endless band saw located adjacent the forward end of the endless belts.

10. Means for breaking down carcasses as claimed in claim 9 wherein a sensing member is positioned so that it is activated on the approach of the carcass to initiate operation of the band saw and the microprocessor.

11. Means for breaking down carcasses as claimed in claim 2 wherein the means for retaining the split carcass halves comprise stabilizing means to clamp and hold the two halves of the carcass located ahead of the splitting means upon a support.

12. Means for breaking down carcasses as claimed in claim 3 wherein the stabilizing means to clamp and hold the two halves of the carcass located ahead of the splitting means upon a support.

13. Means for breaking down carcasses as claimed in claim 9 wherein the means for retaining the split carcass halves comprise stabilizing means to clamp and hold the two halves of the carcass located ahead of the splitting means upon a support.

14. Means for breaking down carcasses as claimed in claim 4 wherein stabilizing means to clamp and hold the two halves of the carcass located ahead of the splitting means upon a support.

15. Means for breaking down carcasses as claimed in claim 10 wherein the means for retaining the split carcass halves comprise stabilizing means to clamp and hold the two halves of the carcass located ahead of the splitting means upon a support.

16. Means for breaking down carcasses as claimed in claim 2 wherein the means for splitting the carcass comprises a circular saw.

17. Means for breaking down carcasses as claimed in claim 15 wherein the microprocessor positions the saw in response to signals fed to the microprocessor from a position transducer located slightly to the rear of the saw.

18. Means for breaking down carcasses as claimed in claim 16 wherein the position transducer is located to contact the surface of the carcass to measure the position of the skin and the saw is controlled to cut the backbone and not the skin.

19. Means for breaking down carcasses as claimed in claim 3 wherein the saw comprises a band saw.

* * * * *

UNITED STATES PATENT AND TRADEMARK OFFICE
CERTIFICATE OF CORRECTION

PATENT NO. : 4,688,296

DATED : August 25, 1987

INVENTOR(S) : Peter T. Clarke et al

It is certified that error appears in the above-identified patent and that said Letters Patent is hereby corrected as shown below:

Abstract, line 1, "braking" should be --breaking--.

Abstract, line 2, "belt" should be --belts--.

Column 1, line 28, delete "the".

Column 1, line 38, "havles" should be --halves--.

Column 2, line 26, after "it" insert --is--.

Column 4, line 33, Claim 12, delete "the".

Column 4, line 54, Claim 17, "15" should be --16--.

Column 4, line 59, Claim 18, "16" should be --17--.

Please insert the following claim:

--20. Means for breaking down carcasses as claimed in claim 8 wherein the position transducer is located to contact the surface of the carcass to measure the position of the skin and the saw is controlled to cut the backbone and not the skin.--.

On the title page "19 Claims" should read --20 Claims--.

Signed and Sealed this

Fourteenth Day of June, 1988

Attest:

DONALD J. QUIGG

Attesting Officer

Commissioner of Patents and Trademarks